E. M. HILL & G. W. LUPTON.
RAKE.
APPLICATION FILED MAR. 12, 1914.
1,125,531.
Patented Jan. 19, 1915.
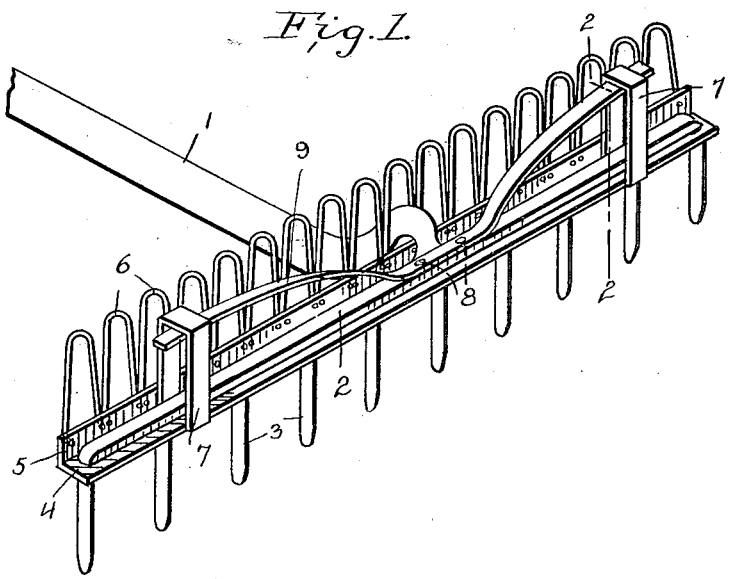
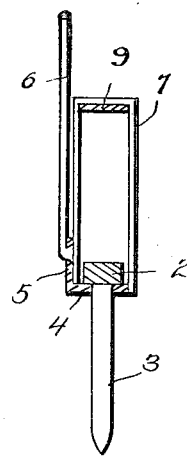
Witnesses
Inventors
E. M. Hill. G. W. Lupton
By
Attorney

UNITED STATES PATENT OFFICE.

EARL M. HILL AND GEORGE W. LUPTON, OF DAYTON, OHIO.

RAKE.

1,125,531.      Specification of Letters Patent.      Patented Jan. 19, 1915.

Application filed March 12, 1914.   Serial No. 824,231.

*To all whom it may concern:*

Be it known that we, EARL M. HILL and GEORGE W. LUPTON, citizens of the United States, residing at Dayton, in the county of Montgomery and State of Ohio, have invented certain new and useful Improvements in Rakes; and we do hereby declare the following to be a full, clear, and exact description of the invention, such as will enable others skilled in the art to which it appertains to make and use the same.

Our invention relates to certain new and useful improvements in rakes and more particularly to simple and inexpensive cleaning means whereby the rake teeth will be stripped of trash and other foreign matter in a reliable and expeditious manner.

An important object of our invention is to provide cleaning means comprising a stripping element arranged to slide upon the teeth of the rake and carrying a plurality of rounded end teeth formed of wire loops, said teeth being adapted for use in connection with the raking of lawns and forming a lawn rake.

Another important object of our invention is to provide a rake of the character described consisting of cleaning means which will operate to clean the lawn rake and ordinary rake teeth in a reliable and expeditious manner.

A still further object of our invention is to provide a rake of the character described which is reliable and efficient in operation, simple as to construction, and cheap to manufacture.

The above and additional objects are accomplished by such means as are illustrated in the accompanying drawings, described in the following specification and then more particularly pointed out in the claims which are appended hereto and form a part of this application.

With reference to the drawings, wherein we have illustrated the preferred embodiment of our invention as it is reduced to practice, and throughout the several views of which similar reference numerals designate corresponding parts: Figure 1 is a perspective view showing our rake in assembled position, and Fig. 2 is a vertical sectional view taken on line 2—2 of Fig. 1 showing the relation of the rake and cleaning element.

Referring to the drawings by characters of reference, the numeral 1 designates a handle to one end of which is secured a rake head 2. The rake head 2 is provided with the usual spaced teeth 3. A stripping bar 4 having a plurality of tooth receiving apertures therein is slidable upon the teeth 3. The bar 4 is provided with an upstanding right angular flange 5 along its rear longitudinal edge.

A plurality of blunt end teeth 6 are secured to the flange 5. The teeth 6 are formed of wire and each tooth consists of a piece of wire formed of a U-shape and secured at its free ends in any suitable manner to the flange 5. The teeth 6 are provided with rounded and blunt terminals and form a rake particularly adapted for use in connection with lawns and the like.

Secured adjacent to each end of the stripping bar 4 is a U-shaped guide bracket 7. The free ends of the guide bracket 7 are secured in any suitable manner to the bar 4 and flange 5 but in such a way that the rake head 2 is vertically movable between the arms of the bracket.

Secured as at 8 in any suitable manner and centrally of its ends to the rake head 2 at a point approximately centrally of the ends of the rake head is a bowed leaf spring 9 that is arranged longitudinally with respect to the head 2. The ends of the spring 9 are disposed within the guide brackets 7 and engage the upper portions of said brackets. The spring 9 serves to normally hold the stripping bar 4 in inoperative position, that is in close relation or in engagement with the rake head 2.

It will be readily seen that when the brackets 7 or teeth 6 carried upon the flange 5 of the stripping bar 4 are pushed downwardly or outwardly, the stripping bar will move toward the free ends of the teeth 3 and remove trash or other foreign matter therefrom. The spring 9 serves to normally hold the stripping bar in inoperative position and operates to automatically return the stripping bar and coöperating parts to normal position.

It will be readily seen that by inverting the rake the teeth 6 may be used for raking lawns and the like. The blunt ends provided on the teeth 6 enable an efficient raking of lawns and other places where it is not desirable to scratch or mar the surface operated upon. The head 2 of the rake serves as a cleaning or stripping bar with relation to the teeth 6 as it will be readily seen that any foreign matter collected between the teeth will be removed by the downward or outward movement of the teeth relative to the rake head 2 and this point we consider one of the most essential of our invention.

It will be readily seen that we have provided a novel form of rake which is most reliable and efficient in operation and capable of performing all functions hereinbefore described.

In reduction to practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claims.

What is claimed is:—

1. In a device of the character described the combination with a rake consisting of a head, handle and teeth on said head, a stripping bar having a plurality of teeth receiving apertures therein, a flange carried on one longitudinal edge of said bar, a plurality of teeth secured on said flange and extending upwardly at right angles to said stripping bar and a spring operatively connected with the stripping bar and head of the rake for returning said stripping bar to normal position.

2. The combination with a rake comprising a handle carrying at one end a head having teeth thereon of a stripping bar having a plurality of teeth receiving apertures therein slidably mounted upon said teeth, a flange carried on one longitudinal edge of said stripping bar and extending upwardly at right angles thereto, a plurality of teeth secured upon said flange and disposed at right angles to said stripping bar and a spring operatively connected with the stripping bar and rake head for returning said stripping bar to normal position.

3. The combination with a rake comprising a handle having a rake head carrying teeth secured at one end thereof, a stripping bar having a plurality of teeth receiving apertures slidable upon said teeth, a flange formed on one longitudinal edge of said stripping bar extending upwardly at right angles thereto, a plurality of teeth mounted on said flange and extending at right angles to said stripping bar, said teeth having their free ends disposed beyond said handle, a pair of U-shaped brackets mounted on said stripping bar, said rake head being disposed within said brackets and a bowed spring secured intermediate its ends to said rake head and having its free ends engaging said U-shaped brackets to hold said stripping bar in inoperative position normally.

4. The combination with a rake comprising a handle having a rake head secured on one end thereof, said rake head having teeth thereon of a stripping bar slidably mounted upon said teeth, a pair of U-shaped brackets secured at their ends to said stripping bar, said rake head being positioned within said brackets, a plurality of blunt ended teeth mounted upon said stripping bar and extending at right angles thereto opposite to the rake teeth and a spring secured upon said rake head and having its ends operatively connected with the brackets to hold said stripping bar in inoperative position.

In testimony whereof we affix our signatures in presence of two witnesses.

EARL M. HILL.
GEORGE W. LUPTON.

Witnesses:
FRANCES A. LUPTON,
FRED. W. HILL.

Copies of this patent may be obtained for five cents each, by addressing the "Commissioner of Patents, Washington, D. C."